June 30, 1931. C. R. ROSS 1,811,896

SPLASHLESS DISHPAN, BASIN, AND THE LIKE

Filed Sept. 23, 1929

Inventor.
Chester R. Ross
by Heard Smith & Tennant.
Attys.

Patented June 30, 1931

1,811,896

UNITED STATES PATENT OFFICE

CHESTER R. ROSS, OF CAMBRIDGE, MASSACHUSETTS

SPLASHLESS DISHPAN, BASIN AND THE LIKE

Application filed September 23, 1929. Serial No. 394,520.

This invention relates to dish pans, wash basins and similar vessels in which dishes, vegetables, meats or other articles are commonly washed and the principal object of the invention is to provide a vessel of this type which will eliminate the splashing of the water over the side of the vessel and onto the clothing and arms of the person using the vessel while articles are being washed therein.

My improved dish pan has its upper edge bent upwardly, inwardly and preferably downwardly to form an annular splash-preventing flange and it is also formed with a vent opening in its side wall situated somewhat below the free edge of the splash-preventing flange, the vent opening being of a size to discharge water from the dish pan as fast as it would run thereinto from a faucet and thus functioning to maintain a predetermined water level in the pan even though the water is flowing into the pan.

The position of the vent opening is such as to maintain the water level at a proper distance below the splash-preventing flange so as to enable the latter to always function properly in preventing the splashing of water. With my improved dish pan it is possible to wash dishes, culinary utensils, vegetables, etc. freely in the pan without danger of splashing water onto the clothing of the person using the pan, while at the same time the proper depth of water in the pan for effectively washing the articles can always be maintained.

In order to give an understanding of the invention I have illustrated in the drawings some selected embodiments thereof which will now be described after which the novel features will be pointed out in the appended claims.

Figure 1:
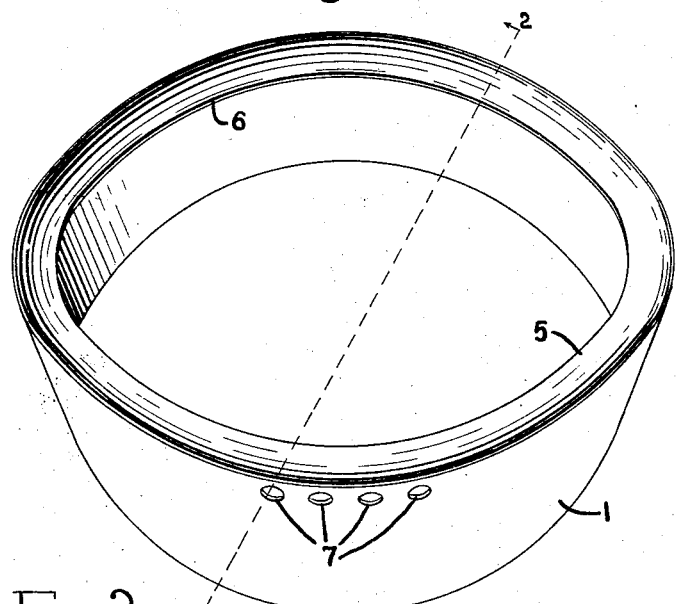
Fig. 1 is a perspective view of a dish pan embodying my invention.
Figure 2:
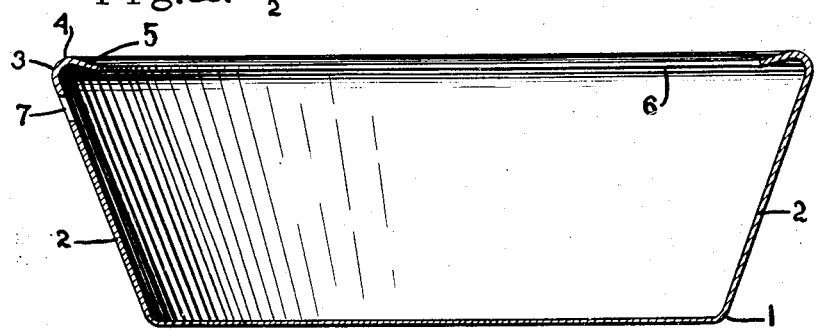
Fig. 2 is an enlarged sectional view on the line 2—2, Fig. 1.
Figure 3:
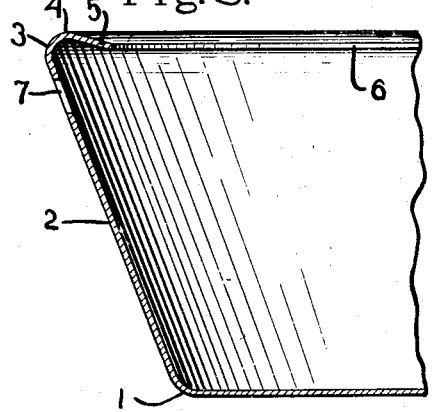
Fig. 3 is a still further enlarged sectional view through one side of the dish pan.

The dish pan is indicated generally at 1 and the side walls 2 thereof are shown as sloping upwardly and outwardly as is usual in dish pans, wash basins and the like. The upper portion of the side walls are bent inwardly and downwardly as shown at 3, 4, 5, the edge 6 being situated somewhat below the highest portion of the bend.

In forming this bend the upwardly and inwardly bent portions 3, 4 merge into each other and into the side walls 2 and downwardly bent portion 5 respectively. The downwardly-extending portion 5 is preferably substantially flat and thus has the shape of a truncated cone. At any point in the flange the downwardly-directed portion 5 is directed toward the bottom of the pan at substantially the opposite corner. The curved portions 3, 4, 5 of the pan constitute an annular splash-preventing flange which is so shaped that any water which is splashed against the side of the pan will follow up around the inside of the curved splash-preventing flange and will be directed back into the pan.

In order that this flange may function properly it is necessary that the water level in the pan should never rise to a height above the edge 6 and in fact it should always be at a certain distance below the edge 6 because if the water level gets up to or nearly up to the edge 6 the water will easily splash over the outwardly-inclined upper face of the portion 5.

In order to ensure that the water level will always be maintained at the proper distance below the splash-preventing flange even though water is being drawn into the dish pan from the faucet, as is frequently done during the washing of dishes, vegetables and the like, I have provided the side wall of my dish pan with one or more vent openings 7. The area of the vent opening should be large enough to accommodate the maximum flow from a faucet. This vent opening may be either one large opening or may be several small openings provided the total cross-sectional area thereof is sufficient to care for any water which might be drawn into the dish pan during any washing operation.

In the construction shown the vent in the side of the dish pan is in the form of several smaller openings but one long slot or single opening of any desired shape would operate equally well.

The dish pan is used in the usual way. While the vent 7 is at the proper distance below the splash-preventing flange yet at the same time it is at a sufficient distance above the bottom of the pan to give the necessary depth of water for washing dishes, vegetables and the like.

I have stated above that in order that the splash-preventing flange may function properly it is necessary that the water level in the pan should always be below the edge 6 of the flange and the vent 7 operates automatically to ensure this condition and thus coacts with the flange to produce an efficient splash-preventing dish pan.

When using the dish pan it will be so placed that the vent will be on the opposite side of the pan from the person using the same. As the articles are being washed any water which is thrown against the walls of the pan will be directed back into the pan by the splash-preventing flange thus preventing the water from being splashed over the arms or clothing of the person using the pan.

Another advantage rising from the use of the vent opening is that if water is being drawn into the dish pan while the washing is proceeding any grease or foreign matter which rises to the top of the dish water may flow off through the vent thereby providing a means for keeping the washing water reasonably clean.

Figure 4:
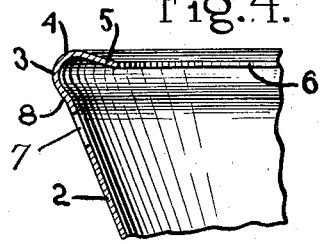
Fig. 4 is a view similar to Fig. 3 showing a modified form of the invention.

In Fig. 4 I have shown a modification of the invention in which the side wall of the dish pan is deformed to present a rib or shoulder 8 directly below the splash-preventing flange. The advantage of this construction is that it facilitates the handling of the dish pan for this rib or shoulder provides a grip which enables a person to carry the pan easily without danger of its slipping from her hands.

I claim:

1. A dish pan having outwardly and upwardly sloping side walls, the upper edges of which are bent inwardly and downwardly to provide an annular continuous splash-preventing flange, the marginal portion of which is flat and of conical form and the free edge of which at any point is directed toward the opposite wall of the dish pan, said dish pan having a vent opening in its side wall slightly below the free edge of the splash-preventing flange and situated to maintain the water level in the dish pan sufficiently below the splash-preventing flange so that any water splashed against the side of the pan will be deflected by said flange back into the pan.

2. A dish pan having its upper edge bent upwardly and inwardly to provide an annular continuous splash-preventing flange, the free edge of which at any point is directed toward the opposite wall of the dish pan, said dish pan having a vent opening in its side wall below the free edge of the splash-preventing flange, said vent maintaining the water level in the dish pan sufficiently below the splash-preventing flange so that any water splashed against the side of the pan will be deflected by said flange back into the pan, the upper portion of the side wall of the pan adjacent the flange being offset throughout the periphery of the pan to provide a continuous hand-hold to facilitate carrying the pan.

In testimony whereof, I have signed my name to this specification.

CHESTER R. ROSS.